United States Patent
Shan

(10) Patent No.: US 10,952,066 B2
(45) Date of Patent: Mar. 16, 2021

(54) DOWNLINK DATA TRANSMISSION METHOD AND APPARATUS

(71) Applicant: Huawei Technologies Co., Ltd., Shenzhen (CN)

(72) Inventor: Huiping Shan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 16/308,963

(22) PCT Filed: Jun. 12, 2016

(86) PCT No.: PCT/CN2016/085470
§ 371 (c)(1),
(2) Date: Dec. 11, 2018

(87) PCT Pub. No.: WO2017/214771
PCT Pub. Date: Dec. 21, 2017

(65) Prior Publication Data
US 2019/0320313 A1  Oct. 17, 2019

(51) Int. Cl.
*H04L 5/00* (2006.01)
*H04W 8/24* (2009.01)
(Continued)

(52) U.S. Cl.
CPC ............ *H04W 8/24* (2013.01); *H04L 5/001* (2013.01); *H04W 16/14* (2013.01); *H04W 72/0453* (2013.01)

(58) Field of Classification Search
None
See application file for complete search history.

(56) References Cited

U.S. PATENT DOCUMENTS 9,461,701 B1 * 10/2016 Mitchener ............ H04B 1/7156
9,999,052 B1 *  6/2018 Marupaduga ..... H04W 72/0453
(Continued)

FOREIGN PATENT DOCUMENTS

CN    102378370 A    3/2012
CN    102457352 A    5/2012
(Continued)

OTHER PUBLICATIONS

"User Equipment (UE) radio transmission and reception", 3GPP TS 36.101 V13.3.0, Mar. 2016. (Year: 2016).*
(Continued)

*Primary Examiner* — Jenkey Van
(74) *Attorney, Agent, or Firm* — Conley Rose, P.C.

(57) ABSTRACT

A downlink data transmission method and apparatus, where the method includes receiving, by a network device, carrier aggregation (CA) capability indication information from a terminal device, where the CA capability indication information indicating, to the network device, that the terminal device supports a first-type intra-band non-contiguous (NC) CA combination on a first frequency band and a maximum downlink spectrum width supported by the terminal device, determining, by the network device based on the CA capability indication information, a first CA combination from at least one first-type intra-band NC CA combination of the first frequency band, where the first CA combination includes at least two component carriers (CCs), and sending, by the network device, downlink data to the terminal device using the first CA combination.

20 Claims, 6 Drawing Sheets

(51) Int. Cl.
*H04W 16/14* (2009.01)
*H04W 72/04* (2009.01)

(56) References Cited

U.S. PATENT DOCUMENTS

| | | | |
|---|---|---|---|
| 2011/0267978 A1* | 11/2011 | Etemad | H04L 5/0016 370/254 |
| 2012/0087257 A1 | 4/2012 | Larsson et al. | |
| 2013/0114508 A1 | 5/2013 | Liang et al. | |
| 2013/0235840 A1 | 9/2013 | Dengkun et al. | |
| 2014/0010192 A1 | 1/2014 | Junren et al. | |
| 2014/0119263 A1 | 5/2014 | Shauh et al. | |
| 2015/0358978 A1 | 12/2015 | Shiang-Jiun et al. | |
| 2016/0302203 A1* | 10/2016 | Liu | H04L 5/001 |
| 2016/0374069 A1* | 12/2016 | Palm | H04L 5/0098 |
| 2017/0238316 A1* | 8/2017 | Li | H04W 72/048 370/329 |
| 2018/0167943 A1* | 6/2018 | Takahashi | H04W 72/0453 |
| 2018/0219652 A1* | 8/2018 | Chen | H04B 7/0626 |
| 2018/0343022 A1* | 11/2018 | Tsutsui | H03F 3/245 |
| 2019/0090126 A1* | 3/2019 | Hayashi | H04W 72/0446 |

FOREIGN PATENT DOCUMENTS

| | | |
|---|---|---|
| CN | 102469611 A | 5/2012 |
| CN | 102986286 A | 3/2013 |
| CN | 104756566 A | 7/2015 |
| WO | 2015113233 A1 | 8/2015 |

OTHER PUBLICATIONS

"User Equipment (UE) radio transmission and reception", 3GPP TS 36.101 V13.3.0., Jun. 2016 (Year: 2016).*
Foreign Communication From a Counterpart Application, PCT Application No. PCT/CN2016/085470, English Translation of International Search Report dated Mar. 2, 2017, 2 pages.
Foreign Communication From a Counterpart Application, PCT Application No. PCT/CN2016/085470, English Translation of Written Opinion dated Mar. 2, 2017, 4 pages.
Machine Translation and Abstract of International Publication No. WO2015113233, Aug. 6, 2015, 32 pages.
Foreign Communication From a Counterpart Application, European Application No. 16904890.7, Extended European Search Report dated Mar. 27, 2019, 9 pages.
Machine Translation and Abstract of Chinese Publication No. CN102469611, May 23, 2012, 11 pages.
Foreign Communication From a Counterpart Application, Chinese Application No. 201680084704.9, Chinese Office Action dated Nov. 29, 2019, 9 pages.

* cited by examiner

DOWNLINK DATA TRANSMISSION METHOD AND APPARATUS

CROSS-REFERENCE TO RELATED APPLICATIONS

This application is a U.S. National Stage of International Patent Applicaton No. PCT/CN2016/085470 filed on Jun. 12, 2016, which is hereby incorporated by reference in its entirety.

TECHNICAL FIELD

Embodiments of the present invention relate to communications technologies, and in particular, to a downlink data transmission method and apparatus.

BACKGROUND

In a licensed-assisted access using Long Term Evolution (Licensed-Assisted Access using Long Term Evolution, LAA-LTE for short) system, a 5 GHz license-free frequency band 46 may be used, based on a carrier aggregation (Carrier Aggregation, CA) technology, to extend an existing LTE service; that is, the license-free frequency band 46 is used to bear some data services in the LTE system.

In the prior art, when using the license-free frequency band 46 to send data to a terminal device, a network device in the LAA-LTE system may first determine, based on a supported carrier aggregation (Carrier Aggregation, CA for short) combination type reported by the terminal device, a specific CA combination type supported by the terminal device, so that the network device may select, based on the CA combination type supported by the terminal device, a CA combination corresponding to the CA combination type to send downlink data to the terminal device, so as to improve a downlink data transmission rate. The foregoing CA combination type may be: a CA combination type in which two component carriers (Component Carrier, CC for short) are included in the frequency band, a CA combination type in which three CCs are included in the frequency band, a CA combination type in which three CCs are included between frequency bands, and the like.

However, when the network device selects, based on the CA combination type reported and supported by the terminal device, a CA combination to send the downlink data to the terminal device, spectrum utilization of the license-free frequency band is relatively low, and a downlink throughput of the terminal device is relatively low.

SUMMARY

Embodiments of the present invention provide a downlink data transmission method and apparatus, so as to resolve a prior-art technical problem that spectrum utilization of a license-free frequency band is relatively low, and a downlink throughput of the terminal device is relatively low when a network device selects, based on a CA combination type that is reported and supported by a terminal device, a CA combination to send downlink data to the terminal device.

According to a first aspect, an embodiment of the present invention provides a downlink data transmission method, where the method includes:

receiving, by a network device, carrier aggregation CA capability indication information sent by a terminal device, where the CA capability indication information is used to indicate, to the network device, that the terminal device supports a first-type intra-band non-contiguous carrier aggregation intra-band NC CA combination on a first frequency band, and a maximum downlink spectrum width supported by the terminal device;

determining, by the network device based on the CA capability indication information, a first CA combination from at least one first-type intra-band NC CA combination of the first frequency band, where the first CA combination includes at least two component carriers CCs; and sending, by the network device, downlink data to the terminal device by using the first CA combination.

In the downlink data transmission method provided in the first aspect, when the first frequency band is a license-free frequency band (that is, B46), the terminal device may still report, to the network device when only some of the first-type intra-band NC CA combinations are supported on the B46, that the first-type intra-band NC CA combination is supported on the B46, and may carry the maximum downlink spectrum width that can be supported by the terminal device in the CA capability indication information, and send the CA capability indication information to the network device. Therefore, after receiving the CA capability indication information, the network device may select, in a plurality of first-type CA combinations of the B46 when the B46 can be used to send the downlink data to the terminal device, the first CA combination matching the maximum downlink spectrum width supported by the terminal device to send the downlink data to the terminal device, so that the terminal device may correctly receive and parse the downlink data. This improves spectrum utilization of the license-free frequency band (that is, the B46), and also improves a downlink throughput of the terminal device.

Further, in a possible implementation of the first aspect, the determining, by the network device based on the CA capability indication information, a first CA combination from at least one first-type intra-band NC CA of the first frequency band specifically includes:

determining, by the network device, a maximum occupied spectrum width based on a spectrum width occupied by each first-type intra-band NC CA combination; and determining, by the network device, the first CA combination based on the maximum occupied spectrum width and the maximum downlink spectrum width supported by the terminal device.

Optionally, in a possible implementation of the first aspect, the determining, by the network device, the first CA combination based on the maximum occupied spectrum width and the maximum downlink spectrum width supported by the terminal device specifically includes:

determining, by the network device based on the maximum occupied spectrum width and the maximum downlink spectrum width supported by the terminal device, that the maximum downlink spectrum width supported by the terminal device is less than the maximum occupied spectrum width;

determining, by the network device from the at least one first-type intra-band NC CA combination of the first frequency band, at least one second available CA combination whose spectrum width is less than or equal to the maximum downlink spectrum width; and determining, by the network device, the first CA combination based on the at least one second available CA combination, where the at least one second available CA combination includes the first CA combination.

In the downlink data transmission method provided in the possible implementation, after receiving the CA capability indication information sent by the terminal device, the network device may determine the maximum occupied spectrum width based on each first-type intra-band NC CA combination configured by the network device on the first frequency band, so as to select, in a plurality of first-type CA combinations of the first frequency band based on the maximum occupied spectrum width and the maximum downlink spectrum width supported by the terminal device, the first CA combination that best matches the maximum downlink spectrum width supported by the terminal device to send the downlink data to the terminal device, so that the terminal device may correctly receive and parse the downlink data. This improves spectrum utilization of the first frequency band, and also improves a downlink throughput of the terminal device.

Optionally, in a possible implementation of the first aspect, the determining, by the network device, the first CA combination based on the maximum occupied spectrum width and the maximum downlink spectrum width supported by the terminal device specifically includes:

determining, by the network device based on the maximum occupied spectrum width and the maximum downlink spectrum width supported by the terminal device, that the maximum downlink spectrum width supported by the terminal device is greater than or equal to the maximum occupied spectrum width; and determining, by the network device, the first CA combination from the at least one first-type intra-band NC CA combination.

In the downlink data transmission method provided in the possible implementation, after receiving the CA capability indication information sent by the terminal device, the network device may determine the maximum occupied spectrum width based on each first-type intra-band NC CA combination configured by the network device on the first frequency band, so as to select, in a plurality of first-type CA combinations of the first frequency band based on the maximum occupied spectrum width and the maximum downlink spectrum width supported by the terminal device, the first CA combination that best matches the maximum downlink spectrum width supported by the terminal device to send the downlink data to the terminal device, so that the terminal device may correctly receive and parse the downlink data. This improves spectrum utilization of the first frequency band, and also improves a downlink throughput of the terminal device.

Optionally, in a possible implementation of the first aspect, the receiving, by a network device, CA capability indication information sent by a terminal device includes:

receiving, by the network device, terminal device capability information sent by the terminal device, where the terminal device capability information includes the CA capability indication information.

According to a second aspect, an embodiment of the present invention provides a downlink data transmission method, where the method includes:

sending, by a terminal device, carrier aggregation CA capability indication information to a network device, where the CA capability indication information is used to indicate, to the network device, that the terminal device supports a first-type intra-band non-contiguous carrier aggregation intra-band NC CA combination on a first frequency band, and a maximum downlink spectrum width supported by the terminal device.

Further, in a possible implementation of the second aspect, before the sending, by a terminal device, carrier aggregation CA capability indication information to a network device, the method further includes:

obtaining, by the terminal device, the maximum downlink spectrum width supported by the terminal device.

Optionally, in a possible implementation of the second aspect, the obtaining, by the terminal device, the maximum downlink spectrum width supported by the terminal device specifically includes:

determining, by the terminal device based on performance of a low noise amplifier LNA of the terminal device, the maximum downlink spectrum width supported by the terminal device.

Optionally, in a possible implementation of the second aspect, the sending, by a terminal device, carrier aggregation CA capability indication information to a network device specifically includes:

sending, by the terminal device, terminal device capability information to the network device, where the terminal device capability information includes the CA capability indication information.

For beneficial effects of the downlink data transmission method provided in the second aspect and each possible implementation of the second aspect, refer to beneficial effects of the first aspect and each possible implementation of the first aspect. Details are not described herein again.

According to a third aspect, an embodiment of the present invention provides a downlink data transmission apparatus, where the apparatus includes:

a receiving module, configured to receive carrier aggregation CA capability indication information sent by a terminal device, where the CA capability indication information is used to indicate, to a network device, that the terminal device supports a first-type intra-band non-contiguous carrier aggregation intra-band NC CA combination on a first frequency band, and a maximum downlink spectrum width supported by the terminal device;

a determining module, configured to determine, based on the CA capability indication information received by the receiving module, a first CA combination from at least one first-type intra-band NC CA combination of the first frequency band, where the first CA combination includes at least two component carriers CCs; and a sending module, configured to send downlink data to the terminal device by using the first CA combination determined by the determining module.

Further, in a possible implementation of the third aspect, the determining module is specifically configured to: determine a maximum occupied spectrum width based on a spectrum width occupied by each first-type intra-band NC CA combination, and determine the first CA combination based on the maximum occupied spectrum width and the maximum downlink spectrum width supported by the terminal device.

Optionally, in a possible implementation of the third aspect, that the determining module is configured to determine the first CA combination based on the maximum occupied spectrum width and the maximum downlink spectrum width supported by the terminal device is specifically:

the determining module is specifically configured to: determine, based on the maximum occupied spectrum width and the maximum downlink spectrum width supported by the terminal device, that the maximum downlink spectrum width supported by the terminal device is less than the maximum occupied spectrum width; determine, from the at least one first-type intra-band NC CA combination of the first frequency band, at least one second available CA combination whose spectrum width is less than or equal to the maximum downlink spectrum width; and determine the first CA combination based on the at least one second available CA combination, where the at least one second available CA combination includes the first CA combination.

Optionally, in a possible implementation of the third aspect, that the determining module is configured to determine the first CA combination based on the maximum occupied spectrum width and the maximum downlink spectrum width supported by the terminal device is specifically:

the determining module is specifically configured to: determine, based on the maximum occupied spectrum width and the maximum downlink spectrum width supported by the terminal device, that the maximum downlink spectrum width supported by the terminal device is greater than or equal to the maximum occupied spectrum width; and determine the first CA combination from the at least one first-type intra-band NC CA combination.

Optionally, in a possible implementation of the third aspect, the receiving module is specifically configured to receive terminal device capability information sent by the terminal device, where the terminal device capability information includes the CA capability indication information.

For beneficial effects of the downlink data transmission apparatus provided in the third aspect and each possible implementation of the third aspect, refer to beneficial effects of the first aspect and each possible implementation of the first aspect. Details are not described herein again.

According to a fourth aspect, an embodiment of the present invention provides a downlink data transmission apparatus, where the apparatus includes:

a sending module, configured to send carrier aggregation CA capability indication information to a network device, where the CA capability indication information is used to indicate, to the network device, that the terminal device supports a first-type intra-band non-contiguous carrier aggregation intra-band NC CA combination on a first frequency band, and a maximum downlink spectrum width supported by the terminal device.

Further, in a possible implementation of the fourth aspect, the apparatus further includes:

an obtaining module, configured to: before the sending module sends the carrier aggregation CA capability indication information to the network device, obtain a maximum downlink spectrum width supported by the terminal device.

Optionally, in a possible implementation of the fourth aspect, the obtaining module is specifically configured to determine, based on performance of a low noise amplifier LNA of the terminal device, the maximum downlink spectrum width supported by the terminal device.

Optionally, in a possible implementation of the fourth aspect, the sending module is specifically configured to send terminal device capability information to the network device, where the terminal device capability information includes the CA capability indication information.

For beneficial effects of the downlink data transmission apparatus provided in the fourth aspect and each possible implementation of the fourth aspect, refer to beneficial effects of the first aspect and each possible implementation of the first aspect. Details are not described herein again.

According to a fifth aspect, an embodiment of the present invention provides a downlink data transmission apparatus, where the apparatus includes:

a receiver, configured to receive carrier aggregation CA capability indication information sent by a terminal device, where the CA capability indication information is used to indicate, to a network device, that the terminal device supports a first-type intra-band non-contiguous carrier aggregation intra-band NC CA combination on a first frequency band, and a maximum downlink spectrum width supported by the terminal device;

a processor, configured to determine, based on the CA capability indication information received by the receiver, a first CA combination from at least one first-type intra-band NC CA combination of the first frequency band, where the first CA combination includes at least two component carriers CCs; and a transmitter, configured to send downlink data to the terminal device by using the first CA combination determined by the processor.

Further, in a possible implementation of the fifth aspect, the processor is specifically configured to: determine a maximum occupied spectrum width based on a spectrum width occupied by each first-type intra-band NC CA combination, and determine the first CA combination based on the maximum occupied spectrum width and the maximum downlink spectrum width supported by the terminal device.

Optionally, in a possible implementation of the fifth aspect, that the processor is configured to determine the first CA combination based on the maximum occupied spectrum width and the maximum downlink spectrum width supported by the terminal device is specifically:

the processor is specifically configured to: determine, based on the maximum occupied spectrum width and the maximum downlink spectrum width supported by the terminal device, that the maximum downlink spectrum width supported by the terminal device is less than the maximum occupied spectrum width; determine, from the at least one first-type intra-band NC CA combination of the first frequency band, at least one second available CA combination whose spectrum width is less than or equal to the maximum downlink spectrum width; and determine the first CA combination based on the at least one second available CA combination, where the at least one second available CA combination includes the first CA combination.

Optionally, in a possible implementation of the fifth aspect, that the processor is configured to determine the first CA combination based on the maximum occupied spectrum width and the maximum downlink spectrum width supported by the terminal device is specifically:

the processor is specifically configured to: determine, based on the maximum occupied spectrum width and the maximum downlink spectrum width supported by the terminal device, that the maximum downlink spectrum width supported by the terminal device is greater than or equal to the maximum occupied spectrum width; and determine the first CA combination from the at least one first-type intra-band NC CA combination.

Optionally, in a possible implementation of the fifth aspect, the receiver is specifically configured to receive terminal device capability information sent by the terminal device, where the terminal device capability information includes the CA capability indication information.

For beneficial effects of the downlink data transmission apparatus provided in the fifth aspect and each possible implementation of the fifth aspect, refer to beneficial effects of the first aspect and each possible implementation of the first aspect. Details are not described herein again.

According to a sixth aspect, an embodiment of the present invention provides a downlink data transmission apparatus, where the apparatus includes:

a transmitter, configured to send carrier aggregation CA capability indication information to a network device, where the CA capability indication information is used to indicate, to the network device, that the terminal device supports a first-type intra-band non-contiguous carrier aggregation intra-band NC CA combination on a first frequency band, and a maximum downlink spectrum width supported by the terminal device.

Further, in a possible implementation of the sixth aspect, the apparatus further includes:

a processor, configured to: before the transmitter sends the carrier aggregation CA capability indication information to the network device, obtain a maximum downlink spectrum width supported by the terminal device.

Optionally, in a possible implementation of the sixth aspect, the processor is specifically configured to determine, based on performance of a low noise amplifier LNA of the terminal device, the maximum downlink spectrum width supported by the terminal device.

Optionally, in a possible implementation of the sixth aspect, the transmitter is specifically configured to send terminal device capability information to the network device, where the terminal device capability information includes the CA capability indication information.

For beneficial effects of the downlink data transmission apparatus provided in the sixth aspect and each possible implementation of the sixth aspect, refer to beneficial effects of the first aspect and each possible implementation of the first aspect. Details are not described herein again.

With reference to the first aspect and each possible implementation of the first aspect, the second aspect and each possible implementation of the second aspect, the third aspect and each possible implementation of the third aspect, the fourth aspect and each possible implementation of the fourth aspect, the fifth aspect and each possible implementation of the fifth aspect, and the sixth aspect and each possible implementation of the sixth aspect, the first frequency band is a licensed-assisted access LAA frequency band.

According to the downlink data transmission method and apparatus provided in the embodiments of the present invention, when the first frequency band is a license-free frequency band (that is, B46), the terminal device may still report, to the network device when only some of the first-type intra-band NC CA combinations are supported on the B46, that the first-type intra-band NC CA combination is supported on the B46, and may carry the maximum downlink spectrum width that can be supported by the terminal device in the CA capability indication information, and send the CA capability indication information to the network device. Therefore, after receiving the CA capability indication information, the network device may select, in a plurality of first-type CA combinations of the B46 when the B46 can be used to send the downlink data to the terminal device, the first CA combination matching the maximum downlink spectrum width supported by the terminal device to send the downlink data to the terminal device, so that the terminal device may correctly receive and parse the downlink data. This improves spectrum utilization of the license-free frequency band (that is, the B46), and improves a downlink throughput of the terminal device.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
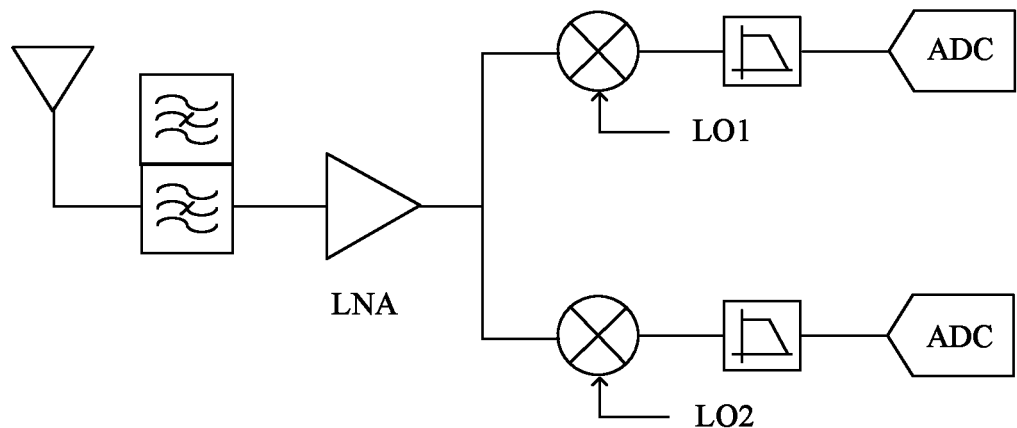
FIG. 1 is a schematic diagram of a radio frequency module of a terminal device according to an embodiment of the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, although terms such as "first", "second", and "third" may be used in the embodiments of the present invention to describe CA combinations, the CA combinations should not be limited by these terms. These terms are only used to differentiate different CA combinations. For example, without departing from the scope of the embodiment of the present invention, the first CA combination may also be referred to as the second CA combination, and similarly, the second CA combination may also be referred to as the first CA combination.

A terminal device mentioned in the embodiments of the present invention may refer to a device that provides a user with voice and/or data connectivity, a handheld device with a radio connection function, or another processing device connected to a wireless modem. The wireless terminal may communicate with one or more core networks through a radio access network (Radio Access Network, RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

A network device in the embodiments of the present invention may be a base station or an access point, or may be a device that is in an access network and communicates, over an air interface, with the wireless terminal by using one or more sectors. The base station may be configured to mutually convert a received over-the-air frame and an IP packet and serve as a router between the wireless terminal and a rest portion of the access network, where the rest portion of the access network may include an Internet protocol (IP) network. The base station may further coordinate attribute management of the air interface. For example, the base station may be a base station (BTS, Base Transceiver Station) in GSM or the CDMA, or may be a base station (NodeB) in WCDMA, or may be an evolved NodeB (eNB or e-NodeB, evolutional NodeB) in the LTE, which is not limited in this application.

The downlink data transmission methods provided in the embodiments of the present invention are applicable to a terminal device that reports, to a network device, an intra-band non-contiguous carrier aggregation (Intra-band Non-contiguous Carrier Aggregation, Intra-band NC CA for short) CA combination type supported by the terminal device in a Long Term Evolution (Long Term Evolution, LTE for short) system or a licensed-assisted access using Long Term Evolution (Licensed-Assisted Access using Long Term Evolution, LAA-LTE for short) system; a network device that selects, based on the intra-band NC CA combination type reported and supported by the terminal device, an intra-band NC CA combination corresponding to the type to send downlink data to the terminal device, and the like.

An LAA frequency band (that is, Band 46, B46 for short) of the LAA-LTE system is used as an example. In the prior art, the terminal device in the LAA-LTE system may report, to a network device, a B46 intra-band NC CACA combination type supported by the terminal device, so as to indicate, to the network device, whether the terminal device supports a CA combination corresponding to the combination type, so that after receiving the B46 intra-band NC CA combination type reported and supported by the terminal device, the network device determines whether the terminal device supports this type of B46 intra-band NC CA combination, and configures an operating mode of this type of B46 intra-band NC CA for the terminal device after determining that the terminal device supports this type of B46 intra-band NC CA combination, and uses this type of B46 intra-band NC CA combination to send downlink data to the terminal device.

For the terminal device, whether a specific type of B46 intra-band NC CA combination is supported by the terminal device supports depends on a low noise amplifier (Low Noise Amplifier, LNA for short) in a radio frequency module of the terminal device. FIG. 1 is a schematic diagram of a radio frequency module of a terminal device according to an embodiment of the present invention. As shown in FIG. 1, the radio frequency module of the existing terminal device includes one LNA, at least one local oscillator (Local Oscillator, LO for short), for example, an LO 1 and an LO 2 shown in FIG. 1, at least one analog-to-digital converter (Analog-to-Digital Converter, ADC for short), and the like. The foregoing LNA may perform amplification processing on a radio signal received by the radio frequency module. However, LNAs in most terminal devices can process only a high frequency signal (that is, a radio signal greater than 2 GHz) with a specific spectrum width (for example, 200-300 MHz), and the LNAs cannot process a high frequency signal beyond spectrum width ranges that can be processed by the LNAs, so that the terminal device cannot correctly receive and parse high frequency signals beyond the spectrum width ranges that can be processed by the LNAs.

Figure 2:
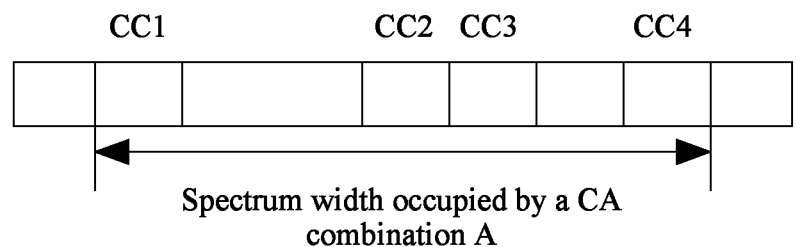
FIG. 2 is a schematic diagram of a spectrum width of a B46 intra-band NC CA combination A according to an embodiment of the present invention.
Figure 3:
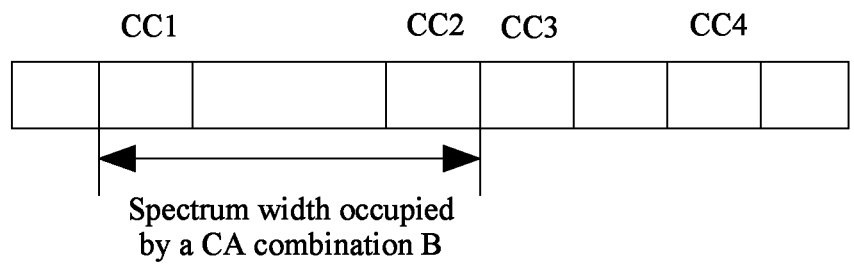
FIG. 3 is a schematic diagram of a spectrum width of a B46 intra-band NC CA combination B according to an embodiment of the present invention.

However, for the LAA frequency band for which a spectrum width of 775 MHz is defined in the LAA-LTE system, a spectrum width occupied by one or more B46 intra-band NC CA combinations corresponding to a B46 intra-band NC CA combination type that may be used by the network device may be greater than a processing capability of the LNA of the terminal device. For example, FIG. 2 is a schematic diagram of a spectrum width of a B46 intra-band NC CA combination A according to an embodiment of the present invention. As shown in FIG. 2, it is assumed that the B46 intra-band NC CA combination type supported by the terminal device is a combination type in which two CCs are included in the frequency band. The B46 includes four CCs: a CC1, a CC2, a CC3, and a CC4; and one of CA combinations A corresponding to the type includes the CC1 and the CC4. Therefore, a spectrum width occupied by the CA combination A is from a start point of a spectrum occupied by the CC1 to an end point of a spectrum occupied by the CC4. FIG. 3 is a schematic diagram of a spectrum width of a B46 intra-band NC CA combination B according to an embodiment of the present invention. As shown in FIG. 3, it is assumed that another CA combination B corresponding to the foregoing type includes the CC1 and the CC2. Therefore, a spectrum width occupied by the CA combination B is from the start point of the spectrum occupied by the CC1 to an end point of a spectrum occupied by the CC2.

In the prior art, if a spectrum width of a radio signal that can be processed by the LNA of the terminal device is less than the spectrum width occupied by the foregoing CA combination A but greater than the spectrum width occupied by the foregoing CA combination B, in this case, the terminal device may send only a B46 intra-band NC CA combination that does not support the type. Consequently, the network device cannot use a CA combination whose spectrum width is less than the spectrum width that can be processed by the LNA of the terminal device (for example, the foregoing CA combination B) to send downlink data to the terminal device. This causes relatively low spectrum utilization of a license-free frequency band (that is, the Band 46) and a relatively low downlink throughput of the terminal device.

However, in the downlink data transmission methods provided in the embodiments of the present invention, if the spectrum width of the radio signal that can be processed by the LNA of the terminal device is less than the spectrum width occupied by the foregoing CA combination A but greater than the spectrum width occupied by the foregoing CA combination B, the terminal device may report, to the network device, CA capability indication information of "supporting the type of B46 intra-band NC CA combination and a maximum downlink spectrum width that can be supported by the terminal device. Therefore, after receiving the CA capability indication information, when the B46 may be used to send the downlink data to the terminal device, the network device may select, based on the maximum downlink spectrum width that can be supported by the terminal device in a plurality of CA combinations corresponding to the B46 intra-band NC CA combination type supported by the terminal device, a CA combination matching the maximum downlink spectrum width that can be supported by the terminal device to send the downlink data to the terminal device. This improves spectrum utilization of the license-free frequency band (that is, the B46), and also improves a downlink throughput of the terminal device. Therefore, the downlink data transmission method in the embodiments of the present invention is intended to resolve a prior-art technical problem that spectrum utilization of the license-free frequency band is relatively low, and a downlink throughput of the terminal device is relatively low when the network device selects, based on the CA combination type that is reported and supported by the terminal device, the CA combination to send the downlink data to the terminal device.

The following describes in detail, by using specific embodiments, the technical solution of the present invention and how the foregoing technical problem is resolved in the technical solution of the present invention. The following specific embodiments may be mutually combined, and same or similar concepts or processes may not be repeatedly described in some embodiments.

Figure 4:
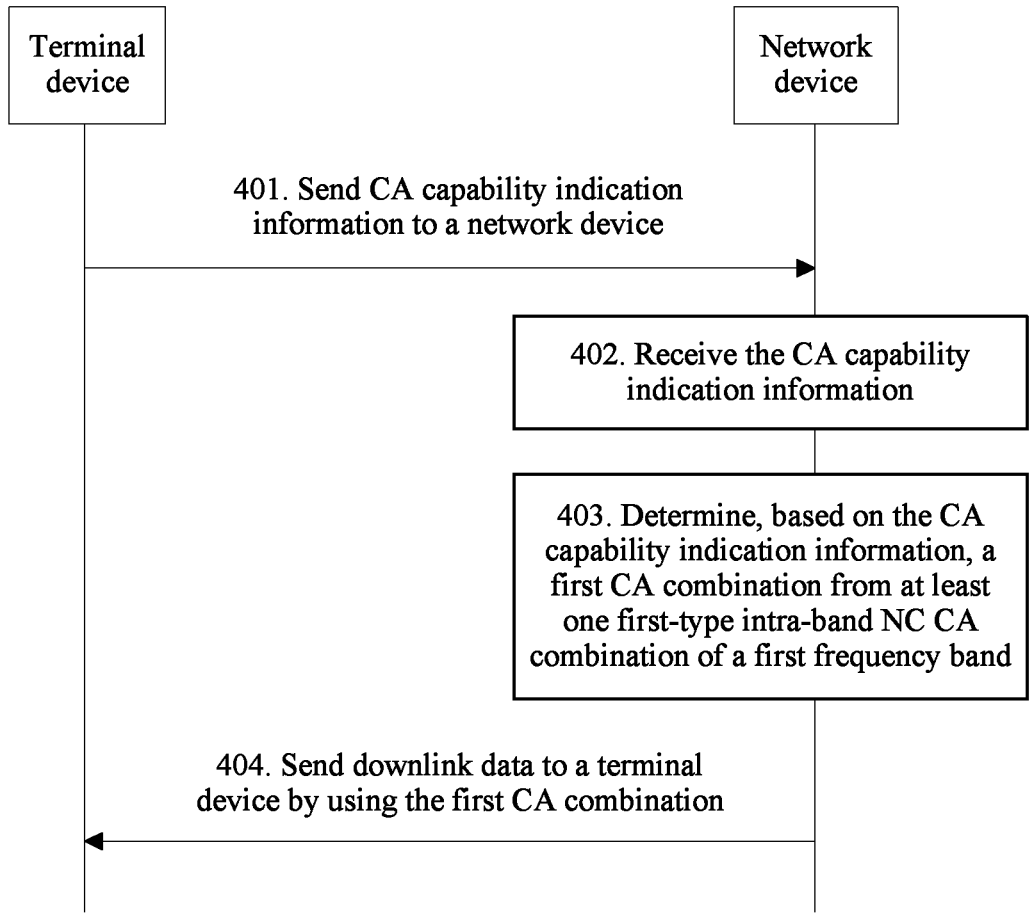
FIG. 4 is a schematic flowchart of Embodiment 1 of a downlink data transmission method according to an embodiment of the present invention.

FIG. 4 is a schematic flowchart of Embodiment 1 of a downlink data transmission method according to an embodiment of the present invention. This embodiment relates to a specific process in which a network device determines, based on CA capability indication information sent by a terminal device, a second CA combination from at least one first intra-band NC CA combination of a first frequency band. As shown in FIG. 4, the method includes the following steps.

S401. The terminal device sends the CA capability indication information to the network device.

Specifically, in this embodiment, the foregoing terminal device may send the CA capability indication information to the network device when performing a radio resource control (Radio Resource Control, RRC for short) access procedure, or after receiving a request message of requesting reporting the CA capability that is sent by the network device. If the foregoing terminal device sends the CA capability indication information to the network device when performing the RRC access procedure, the foregoing terminal device may carry the foregoing CA capability indication information in any RRC signaling (for example, the RRC signaling may be terminal device capability information, that is, user equipment capability information), and send the RRC signaling to the network device, or the CA capability indication information may be separately sent to the network device.

The foregoing CA capability indication information includes not only indication information indicating that the terminal device supports a first-type intra-band NC CA combination on a first frequency band, but also includes indication information indicating a maximum downlink spectrum width supported by the terminal device, that is, further includes indication information indicating a maximum spectrum width occupied by a radio signal that can be received by the terminal device. It should be noted that the foregoing first frequency band may be a frequency band used by a communications system in which the terminal device is located. An LAA-LTE system is used as an example, and the foregoing first frequency band may be any frequency band in Band 39, Band 40, Band 41, an LAA frequency band (that is, Band 46), and the like. The foregoing first type may be specifically any type in the intra-band NC CA combination type included in the foregoing first frequency band, and is used to indicate a quantity of CCs included in the CA combination that can be supported by the terminal device.

In this embodiment of the present invention, for how the foregoing CA capability indication information indicates, to the network device, that the terminal device supports the first-type intra-band NC CA on the first frequency band, reference may be specifically made to the prior art, and details are not described in the present invention. In addition, how the foregoing CA capability indication information indicates, to the network device, the maximum downlink spectrum width supported by the terminal device is not limited in this embodiment of the present invention. Optionally, the foregoing CA capability indication information may indicate, to the network device by using one field, the maximum downlink spectrum width supported by the terminal device. The field may be corresponding to a plurality of bit numbers, and a binary number including the plurality of bit numbers may be in a one-to-one correspondence with the maximum downlink spectrum width supported by the terminal device. Optionally, the foregoing field may alternatively be corresponding to one bit number. For example, when a value of the bit number is 1, it indicates that the maximum downlink spectrum width supported by the terminal device is equal to half of a spectrum width of the first frequency band, and when the value of the bit number is 0, it indicates that the maximum downlink spectrum width supported by the terminal device is equal the full spectrum width of the first frequency band; or when the value of the bit number is 0, it indicates that the maximum downlink spectrum width supported by the terminal device is equal to half of the spectrum width of the first frequency band, and when the value of the bit number is 1, it indicates that the maximum downlink spectrum width supported by the terminal device is equal the full spectrum width of the first frequency band. In specific implementation, a bit number corresponding to the foregoing field and a meaning represented by the bit number corresponding to the foregoing field may be selected based on a user requirement. Details are not described in the present invention.

S402. The network device receives the CA capability indication information.

S403. The network device determines, based on the CA capability indication information, a first CA combination from at least one first-type intra-band NC CA combination of the first frequency band.

The foregoing first carrier combination includes at least two CCs.

Specifically, in the prior art, application scenarios of different network devices are different, and therefore, different network devices are configured with different quantities of first-type intra-band NC CA combinations on the first frequency band. Although quantities of CCs included in combinations are the same, spectrum widths occupied by the combinations may be different. Therefore, after receiving the CA capability indication information sent by the terminal device, when a listen before talk (Listen-Before-Talk, LBT for short) condition is met, the network device may determine, based on the CA capability indication information in the configured at least one first-type intra-band NC CA combination of the first frequency band, the first CA combination matching the maximum downlink spectrum width supported by the terminal device. Optionally, the network device may use any first-type CA combination whose occupied spectrum width is less than or equal to the maximum downlink spectrum width supported by the terminal device as the first CA combination, so that when the network device sends downlink data to the terminal device by using the first CA combination, the terminal device can correctly receive and parse the downlink data.

S404. The network device sends downlink data to the terminal device by using the first CA combination.

According to the downlink data transmission method provided in this embodiment of the present invention, when the first frequency band is a license-free frequency band (that is, B46), the terminal device may still report, to the network device when only some of the first-type intra-band NC CA combinations are supported on the B46, that the first-type intra-band NC CA combination is supported on the B46, and may carry the maximum downlink spectrum width that can be supported by the terminal device in the CA capability indication information, and send the CA capability indication information to the network device. Therefore, after receiving the CA capability indication information, the network device may select, in a plurality of first-type CA combinations of the B46 when the B46 can be used to send the downlink data to the terminal device, the first CA combination matching the maximum downlink spectrum width supported by the terminal device to send the downlink data to the terminal device, so that the terminal device may correctly receive and parse the downlink data. This improves spectrum utilization of the license-free frequency band (that is, the B46), and also improves a downlink throughput of the terminal device.

As described in the foregoing embodiment, the CA capability indication information of the terminal device may carry indication information indicating, to the network device, that the terminal device supports the first-type intra-band NC CA combination on the first frequency band and the maximum downlink spectrum width supported by the terminal device. Therefore, based on the foregoing embodiment, before the foregoing S401, the method may further include: obtaining, by the terminal device, the maximum downlink spectrum width supported by the terminal device. How the foregoing terminal device obtains the maximum downlink spectrum width supported by the terminal device is not limited in this embodiment of the present invention. In specific implementation, the terminal device may determine, based on performance of an LNA of the terminal device, the maximum downlink spectrum width supported by the terminal device, that is, a spectrum width of a radio signal that can be processed by the LNA is used as the maximum downlink spectrum width supported by the terminal device. Optionally, the maximum downlink spectrum width supported by the foregoing terminal device may alternatively be a maximum downlink spectrum width preset in the terminal device. In this case, the foregoing terminal device may directly obtain the maximum downlink spectrum width stored in the terminal device.

Figure 5:
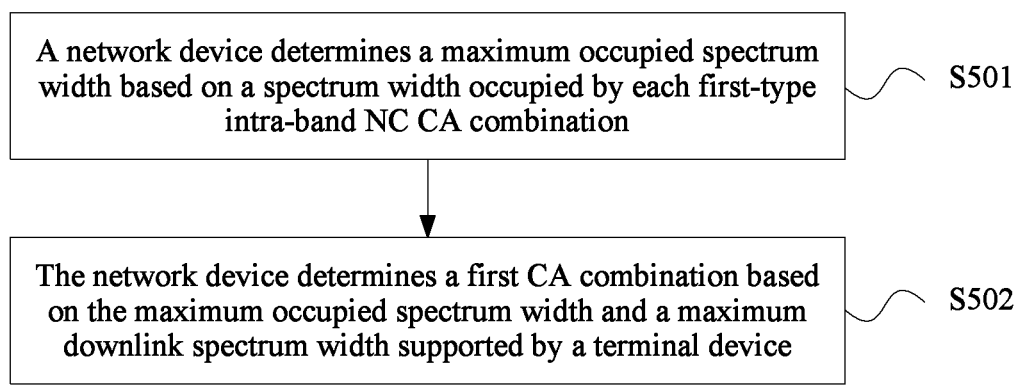
FIG. 5 is a schematic flowchart of Embodiment 2 of a downlink data transmission method according to an embodiment of the present invention.

FIG. 5 is a schematic flowchart of Embodiment 2 of a downlink data transmission method according to an embodiment of the present invention. This embodiment relates to a specific process in which the network device determines, based on CA capability indication information, a first CA combination from at least one first-type intra-band NC CA combination of a first frequency band after obtaining the CA capability indication information sent by a terminal device. Based on the foregoing embodiment, as shown in FIG. 5, the foregoing S403 may include the following steps.

S501. The network device determines a maximum occupied spectrum width based on a spectrum width occupied by each first-type intra-band NC CA combination.

Specifically, application scenarios of different network devices are different. Therefore, in the prior art, quantities of first-type intra-band NC CA combinations configured for different network devices on the first frequency band may be different. In addition, spectrum widths occupied by the CA combinations may be different, and therefore, after the network device obtains the CA capability indication information sent by the terminal device, when an LBT condition is met, the network device may determine the maximum occupied spectrum width based on a spectrum width occupied by each configured first-type intra-band NC CA combination, that is, determine a specific first-type intra-band NC CA combination that occupies the maximum spectrum width.

For example, it is assumed that the first-type (that is, each CA combination includes two CCs) intra-band NC CA combinations configured for the network devices on the first frequency band are respectively: a CA combination 1 (a CC1 and a CC6), a CA combination 2 (a CC2 and a CC5), a CA combination 3 (a CC2 and a CC3), a CA combination 4 (a CC1 and a CC5), a CA combination 5 (a CC1 and a CC2), and a CA combination 6 (a CC5 and a CC6). When a spectrum width occupied by the CA combination 1 is greater than spectrum widths respectively occupied by the CA combination 2, the CA combination 3, the CA combination 4, the CA combination 5, and the CA combination 6, the network device may determine the spectrum width occupied by the CA combination 1 as the maximum occupied spectrum width.

S502. The network device determines the first CA combination based on the maximum occupied spectrum width and the maximum downlink spectrum width supported by the terminal device.

Specifically, after the network device determines a maximum occupied spectrum width of the first-type intra-band NC CA combination configured on the first frequency band, the network device may determine the first CA combination based on the maximum occupied spectrum width and the maximum downlink spectrum width supported by the terminal device. Specifically, there are two cases.

Case 1: The maximum downlink spectrum width supported by the terminal device is less than the maximum occupied spectrum width.

Figure 6:
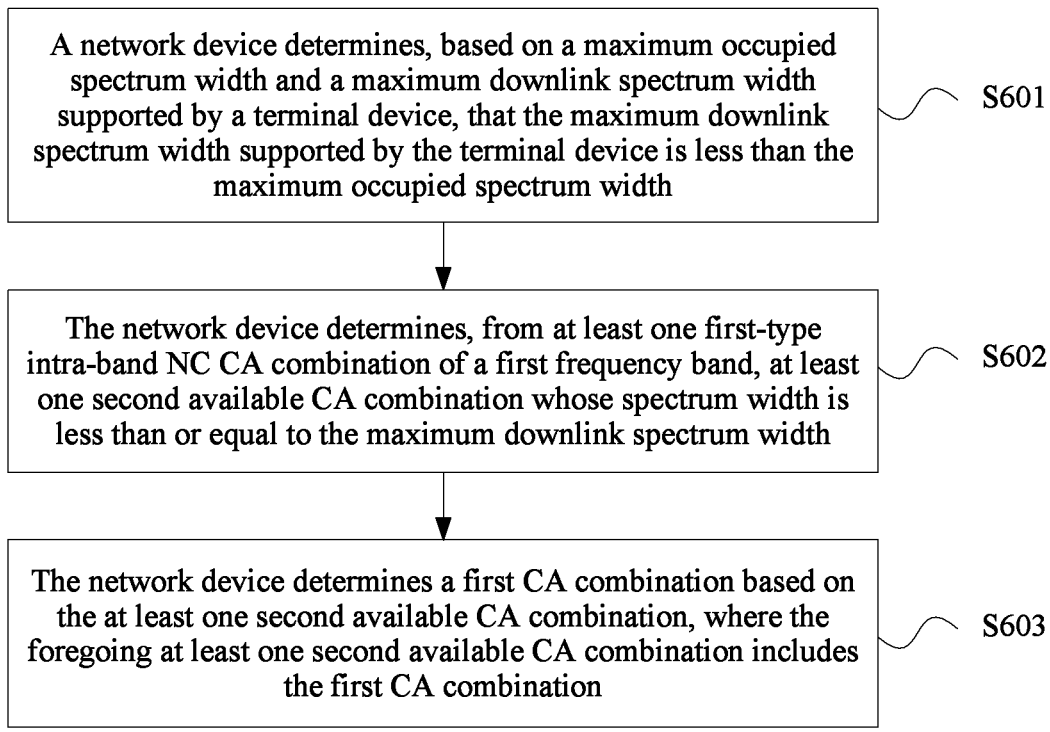
FIG. 6 is a schematic flowchart of Embodiment 3 of a downlink data transmission method according to an embodiment of the present invention.

FIG. 6 is a schematic flowchart of Embodiment 3 of a downlink data transmission method according to an embodiment of the present invention. As shown in FIG. 6, the foregoing S502 may include the following steps.

S601. The network device determines, based on the maximum occupied spectrum width and the maximum downlink spectrum width supported by the terminal device, that the maximum downlink spectrum width supported by the terminal device is less than the maximum occupied spectrum width.

Specifically, the network device may compare a specific value of the maximum occupied spectrum width with a specific value of the maximum downlink spectrum width supported by the terminal device, so as to determine whether the maximum downlink spectrum width supported by the terminal device is less than the maximum occupied spectrum width.

S602. The network device determines, from the at least one first-type intra-band NC CA combination of the first frequency band, at least one second available CA combination whose spectrum width is less than or equal to the maximum downlink spectrum width.

Specifically, if the network device determines that the maximum downlink spectrum width supported by the terminal device is less than the maximum occupied spectrum width, the network device may use at least one currently available CA combination whose spectrum width is less than or equal to the maximum downlink spectrum width in the at least one first-type intra-band NC CA combination configured on the first frequency band as a second CA combination. The available CA combination described herein is a CA combination that can be currently used by the network device.

Still referring to the example of the foregoing S501, when it is assumed that spectrum widths occupied by the CA combination 1 and the CA combination 4 in the first-type intra-band NC CA combinations configured for the network device are greater than the maximum downlink spectrum width of the terminal device, a maximum spectrum width occupied by the CA combination 2 is equal to the maximum downlink spectrum width of the terminal device, and maximum spectrum widths respectively occupied by the CA combination 3, the CA combination 5, and the CA combination 6 are less than the maximum downlink spectrum width of the terminal device, and the network device is using the CA combination 6 to send downlink data to another terminal device, that the network device determines at least one second available CA combination whose spectrum width is less than or equal to the maximum downlink spectrum width may be specifically: The network device may use the CA combination 2, the CA combination 3, and the CA combination 5 whose spectrum widths are less than or equal to the maximum downlink spectrum width as the second available CA combination.

S603. The network device determines the first CA combination based on the at least one second available CA combination, where the foregoing at least one second available CA combination includes the first CA combination.

Specifically, if the network device determines one second available CA combination from the at least one first-type intra-band NC CA combination of the first frequency band, the second available CA combination is the first CA combination, that is, the network device may directly use the first CA combination to send the downlink data to the terminal device, so that the terminal device may correctly receive and parse the downlink data. This improves spectrum utilization of the first frequency band, and also improves a downlink throughput of the terminal device.

If the network device determines a plurality of second available CA combinations from the at least one first-type intra-band NC CA combination of the first frequency band, the network device may randomly select, from the plurality of second available CA combinations, one second available CA combination as the first CA combination, or determine, from the plurality of second available CA combinations based on an amount of downlink data to be sent by the network device to the terminal device, a first CA combination matching the amount of the downlink data to be sent, so that the network device can not only improve the spectrum utilization of the first frequency band, but also save a system resource bandwidth when using the first CA combination to send the downlink data to the terminal device. For the determining, based on an amount of downlink data to be sent by the network device to the terminal device, the first CA combination matching the amount of the downlink data to be sent, refer to the prior art, and details are not described herein.

Case 2: The maximum downlink spectrum width supported by the terminal device is greater than or equal to the maximum occupied spectrum width.

Figure 7:
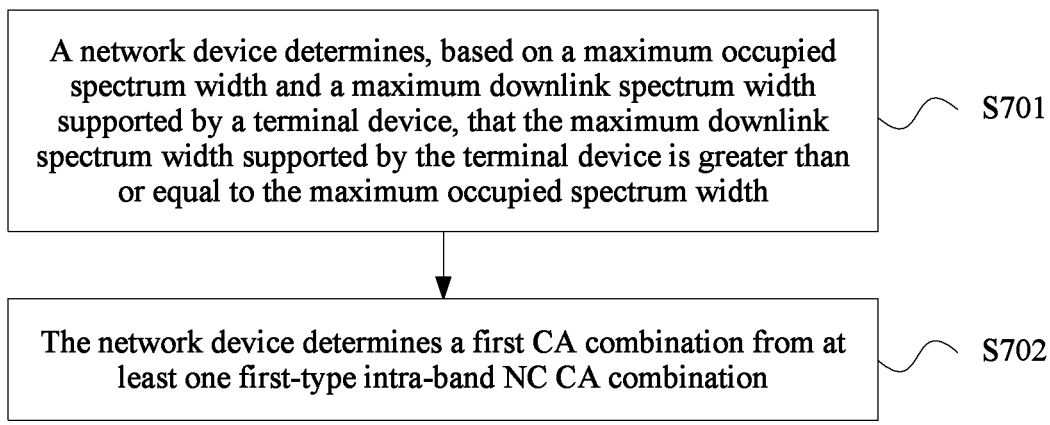
FIG. 7 is a schematic flowchart of Embodiment 4 of a downlink data transmission method according to an embodiment of the present invention.

FIG. 7 is a schematic flowchart of Embodiment 4 of a downlink data transmission method according to an embodiment of the present invention. As shown in FIG. 7, the foregoing S502 may include the following steps.

S701. The network device determines, based on the maximum occupied spectrum width and the maximum downlink spectrum width supported by the terminal device, that the maximum downlink spectrum width supported by the terminal device is greater than or equal to the maximum occupied spectrum width.

S702. The network device determines the first CA combination from the at least one first-type intra-band NC CA combination.

Specifically, if the network device determines that the maximum downlink spectrum width supported by the terminal device is greater than or equal to the maximum occupied spectrum width, the network device may select any available CA combination in the at least one first-type intra-band NC CA combination configured on the first frequency band as the first CA combination. Still referring to the example of the foregoing S501, that the foregoing network device determines the first CA combination from the at least one intra-band NC CA combination when it is determined that the maximum downlink spectrum width supported by the terminal device is greater than or equal to the maximum occupied spectrum width may be specifically: The foregoing network device may use any one of the CA combination 1, the CA combination 2, the CA combination 3, the CA combination 4, and the CA combination 5 as the first CA combination.

In another implementation of the present invention, the foregoing network device may first determine at least one currently available CA combination (that is, a third available CA combination) in the foregoing at least one first-type intra-band NC CA combination, so that the network device may determine, in the at least one third available CA combination based on the amount of downlink data to be sent by the network device to the terminal device, a first CA combination matching the amount of the downlink data to be sent, so that the network device can not only improve the spectrum utilization of the first frequency band, but also save a system resource bandwidth when using the first CA combination to send the downlink data to the terminal device.

According to the downlink data transmission method provided in this embodiment of the present invention, when the first frequency band is a license-free frequency band (that is, the B46), the terminal device may still report, to the network device when only some of the first-type intra-band NC CA combinations are supported on the B46, that the first-type intra-band NC CA combination is supported on the B46, and may carry the maximum downlink spectrum width that can be supported by the terminal device in the CA capability indication information, and send the CA capability indication information to the network device. Therefore, after receiving the CA capability indication information, the network device may select, in the at least one first-type intra-band NC CA combination of the B46 when the B46 can be used to send the downlink data to the terminal device, the first CA combination matching the maximum downlink spectrum width supported by the terminal device to send the downlink data to the terminal device, so that the terminal device may correctly receive and parse the downlink data. This improves spectrum utilization of the license-free frequency band (that is, the B46), and also improves a downlink throughput of the terminal device.

It should be noted that the downlink data transmission method in the embodiments of the present invention includes but is not limited to the foregoing application scenarios. The downlink data transmission method provided in the embodiments of the present invention may be used in any scenario in which the network device uses the intra-band NC CA to send the downlink data to the terminal device.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Figure 8:
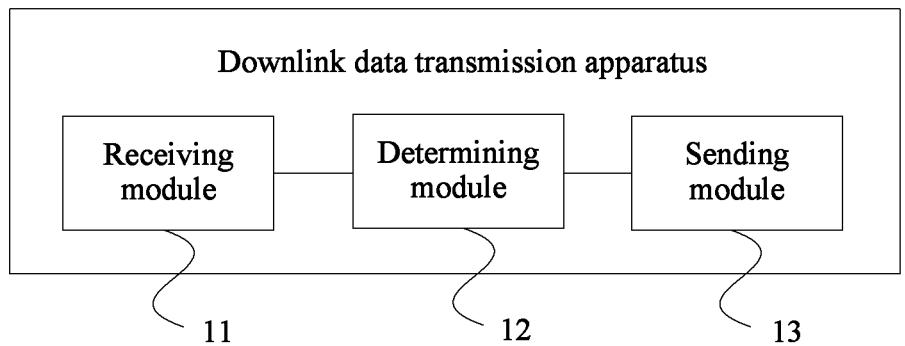
FIG. 8 is a schematic structural diagram of Embodiment 1 of a downlink data transmission apparatus according to an embodiment of the present invention.

FIG. 8 is a schematic structural diagram of Embodiment 1 of a downlink data transmission apparatus according to an embodiment of the present invention. As shown in FIG. 8, the downlink data transmission apparatus may be implemented as a part or all of a network device by using software, hardware, or a combination of software and hardware. The downlink data transmission apparatus may include a receiving module 11, a determining module 12, and a sending module 13.

The receiving module 11 may be configured to receive carrier aggregation CA capability indication information sent by a terminal device, where the CA capability indication information is used to indicate, to a network device, that the terminal device supports a first-type intra-band non-contiguous carrier aggregation intra-band NC CA combination on a first frequency band, and a maximum downlink spectrum width supported by the terminal device. An LAA-LTE system is used as an example, and the foregoing first frequency band may be any frequency band in Band 39, Band 40, Band 41, an LAA frequency band (that is, Band 46), and the like.

The determining module 12 may be configured to determine, based on the CA capability indication information received by the receiving module 11, a first CA combination from at least one first-type intra-band NC CA combination of the first frequency band, where the first CA combination includes at least two component carriers CCs.

The sending module 13 may be configured to send downlink data to the terminal device by using the first CA combination determined by the determining module 12.

The downlink data transmission apparatus provided in this embodiment of the present invention may perform the foregoing method embodiment. An implementation principle and a technical effect of the apparatus are similar to those of the foregoing method embodiment, and details are not described herein again.

Optionally, the foregoing receiving module 11 may specifically obtain the CA capability indication information by receiving terminal device capability information sent by the terminal device, where the terminal device capability information includes the CA capability indication information.

Optionally, the foregoing determining module 12 may be specifically configured to: determine a maximum occupied spectrum width based on a spectrum width occupied by each first-type intra-band NC CA combination, and determine the first CA combination based on the maximum occupied spectrum width and the maximum downlink spectrum width supported by the terminal device.

In an implementation of the present invention, that the foregoing determining module 12 is configured to determine the first CA combination based on the maximum occupied spectrum width and the maximum downlink spectrum width supported by the terminal device may be specifically:

the foregoing determining module 12 may be specifically configured to: determine, based on the maximum occupied spectrum width and the maximum downlink spectrum width supported by the terminal device, that the maximum downlink spectrum width supported by the terminal device is less than the maximum occupied spectrum width; determine, from the at least one first-type intra-band NC CA combination of the first frequency band, at least one second available CA combination whose spectrum width is less than or equal to the maximum downlink spectrum width; and determine the first CA combination based on the at least one second available CA combination, where the at least one second available CA combination includes the first CA combination.

In another implementation of the present invention, that the foregoing determining module 12 is configured to determine the first CA combination based on the maximum occupied spectrum width and the maximum downlink spectrum width supported by the terminal device may be specifically:

the foregoing determining module 12 may be specifically configured to: determine, based on the maximum occupied spectrum width and the maximum downlink spectrum width supported by the terminal device, that the maximum downlink spectrum width supported by the terminal device is greater than or equal to the maximum occupied spectrum width; and determine the first CA combination from the at least one first-type intra-band NC CA combination.

The downlink data transmission apparatus provided in this embodiment of the present invention may perform the foregoing method embodiment. An implementation principle and a technical effect of the apparatus are similar to those of the foregoing method embodiment, and details are not described herein again.

Figure 9:
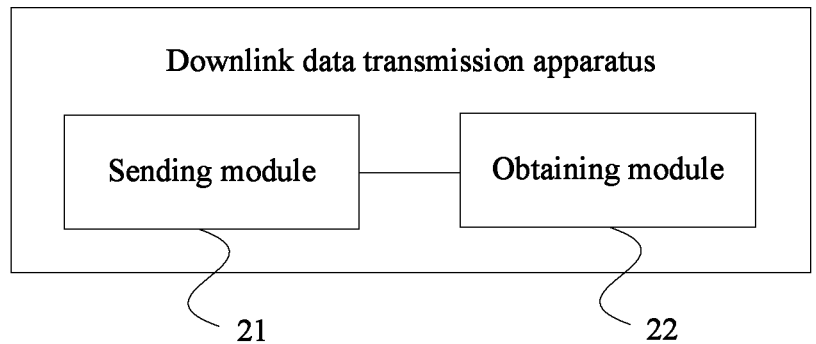
FIG. 9 is a schematic structural diagram of Embodiment 2 of a downlink data transmission apparatus according to an embodiment of the present invention.

FIG. 9 is a schematic structural diagram of Embodiment 2 of a downlink data transmission apparatus according to an embodiment of the present invention. As shown in FIG. 9, the downlink data transmission apparatus may be implemented as a part or all of a terminal device by using software, hardware, or a combination of software and hardware. The downlink data transmission apparatus may include a sending module 21.

The sending module 21 is configured to send carrier aggregation CA capability indication information to a network device, where the CA capability indication information is used to indicate, to the network device, that the terminal device supports a first-type intra-band non-contiguous carrier aggregation intra-band NC CA combination on a first frequency band, and a maximum downlink spectrum width supported by the terminal device. An LAA-LTE system is used as an example, and the foregoing first frequency band may be any frequency band in Band 39, Band 40, Band 41, an LAA frequency band (that is, Band 46), and the like.

The downlink data transmission apparatus provided in this embodiment of the present invention may perform the foregoing method embodiment. An implementation principle and a technical effect of the apparatus are similar to those of the foregoing method embodiment, and details are not described herein again.

Optionally, in an implementation of the present invention, the foregoing sending module 21 may be specifically configured to send terminal device capability information carrying the CA capability indication information to the network device.

Still referring to the foregoing FIG. 9, the foregoing apparatus may further include an obtaining module 22, configured to: before the sending module 21 sends the carrier aggregation CA capability indication information to the network device, obtain the maximum downlink spectrum width supported by the terminal device.

In an implementation of the present invention, the foregoing obtaining module 22 may be specifically configured to determine, based on performance of a low noise amplifier LNA of the terminal device, the maximum downlink spectrum width supported by the terminal device.

The downlink data transmission apparatus provided in this embodiment of the present invention may perform the foregoing method embodiment. An implementation principle and a technical effect of the apparatus are similar to those of the foregoing method embodiment, and details are not described herein again.

Figure 10:
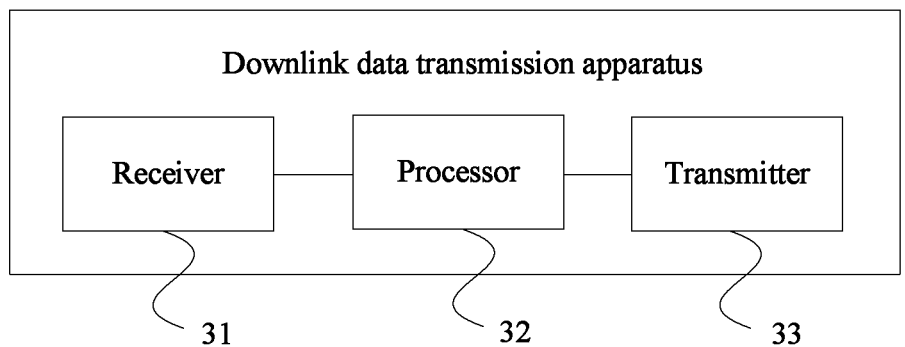
FIG. 10 is a schematic structural diagram of Embodiment 3 of a downlink data transmission apparatus according to an embodiment of the present invention.

FIG. 10 is a schematic structural diagram of Embodiment 3 of a downlink data transmission apparatus according to an embodiment of the present invention. As shown in FIG. 10, the downlink data transmission apparatus may be a network device, and the downlink data transmission apparatus may include a receiver 31, a processor 32, and a transmitter 33. The receiver 31 and the transmitter 33 may be integrated in a transceiver of the downlink data transmission apparatus, or may be an independent transceiver antenna on the downlink data transmission apparatus.

The receiver 31 may be configured to receive carrier aggregation CA capability indication information sent by a terminal device, where the CA capability indication information is used to indicate, to a network device, that the terminal device supports a first-type intra-band non-contiguous carrier aggregation intra-band NC CA combination on a first frequency band, and a maximum downlink spectrum width supported by the terminal device. An LAA-LTE system is used as an example, and the foregoing first frequency band may be any frequency band in Band 39, Band 40, Band 41, an LAA frequency band (that is, Band 46), and the like.

The processor 32 may be configured to determine, based on the CA capability indication information received by the receiver 31, a first CA combination from at least one first-type intra-band NC CA combination of the first frequency band, where the first CA combination includes at least two component carriers CCs.

The transmitter 33 may be configured to send downlink data to the terminal device by using the first CA combination determined by the processor 32.

The downlink data transmission apparatus provided in this embodiment of the present invention may perform the foregoing method embodiment. An implementation principle and a technical effect of the apparatus are similar to those of the foregoing method embodiment, and details are not described herein again.

Optionally, the foregoing receiver 31 may be specifically configured to receive terminal device capability information sent by the terminal device, where the terminal device capability information includes the CA capability indication information.

Optionally, the foregoing processor 32 may be specifically configured to: determine a maximum occupied spectrum width based on a spectrum width occupied by each first-type intra-band NC CA combination, and determine the first CA combination based on the maximum occupied spectrum width and the maximum downlink spectrum width supported by the terminal device.

In an implementation of the present invention, that the foregoing processor 32 is configured to determine the first CA combination based on the maximum occupied spectrum width and the maximum downlink spectrum width supported by the terminal device may be specifically:

the foregoing processor 32 may be specifically configured to: determine, based on the maximum occupied spectrum width and the maximum downlink spectrum width supported by the terminal device, that the maximum downlink spectrum width supported by the terminal device is less than the maximum occupied spectrum width; determine, from the at least one first-type intra-band NC CA combination of the first frequency band, at least one second available CA combination whose spectrum width is less than or equal to the maximum downlink spectrum width; and determine the first CA combination based on the at least one second available CA combination, where the at least one second available CA combination includes the first CA combination.

In another implementation of the present invention, that the foregoing processor 32 is configured to determine the first CA combination based on the maximum occupied spectrum width and the maximum downlink spectrum width supported by the terminal device may be specifically:

the foregoing processor 32 may be specifically configured to: determine, based on the maximum occupied spectrum width and the maximum downlink spectrum width supported by the terminal device, that the maximum downlink spectrum width supported by the terminal device is greater than or equal to the maximum occupied spectrum width; and determine the first CA combination from the at least one first-type intra-band NC CA combination.

The downlink data transmission apparatus provided in this embodiment of the present invention may perform the foregoing method embodiment. An implementation principle and a technical effect of the apparatus are similar to those of the foregoing method embodiment, and details are not described herein again.

Figure 11:
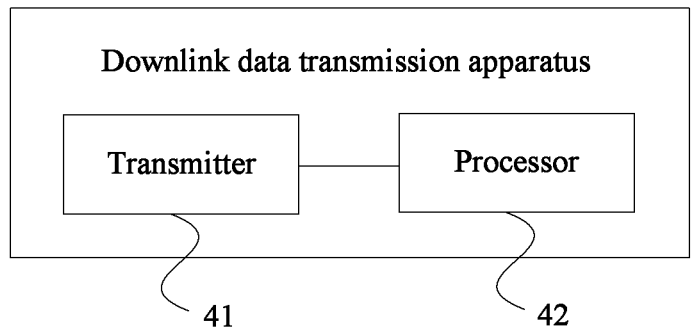
FIG. 11 is a schematic structural diagram of Embodiment 4 of a downlink data transmission apparatus according to an embodiment of the present invention.

FIG. 11 is a schematic structural diagram of Embodiment 4 of a downlink data transmission apparatus according to an embodiment of the present invention. As shown in FIG. 11, the downlink data transmission apparatus may be a terminal device, and the downlink data transmission apparatus may include a transmitter 41. The transmitter 41 may be integrated in a transceiver of the terminal device, or may be an independent transceiver antenna on the terminal device.

The transmitter 41 is configured to send carrier aggregation CA capability indication information to a network device, where the CA capability indication information is used to indicate, to the network device, that the terminal device supports a first-type intra-band non-contiguous carrier aggregation intra-band NC CA combination on a first frequency band, and a maximum downlink spectrum width supported by the terminal device. An LAA-LTE system is used as an example, and the foregoing first frequency band may be any frequency band in Band 39, Band 40, Band 41, an LAA frequency band (that is, Band 46), and the like.

The downlink data transmission apparatus provided in this embodiment of the present invention may perform the foregoing method embodiment. An implementation principle and a technical effect of the apparatus are similar to those of the foregoing method embodiment, and details are not described herein again.

Optionally, in an implementation of the present invention, the foregoing transmitter 41 may be specifically configured to send terminal device capability information carrying the CA capability indication information to the network device.

Still referring to FIG. 11, the foregoing apparatus may further include:

a processor 42, configured to: before the transmitter 41 sends the carrier aggregation CA capability indication information to the network device, obtain a maximum downlink spectrum width supported by the terminal device.

In an implementation of the present invention, the foregoing processor 42 may be specifically configured to determine, based on performance of a low noise amplifier LNA of the terminal device, the maximum downlink spectrum width supported by the terminal device.

The downlink data transmission apparatus provided in this embodiment of the present invention may perform the foregoing method embodiment. An implementation principle and a technical effect of the apparatus are similar to those of the foregoing method embodiment, and details are not described herein again.

Figure 12:
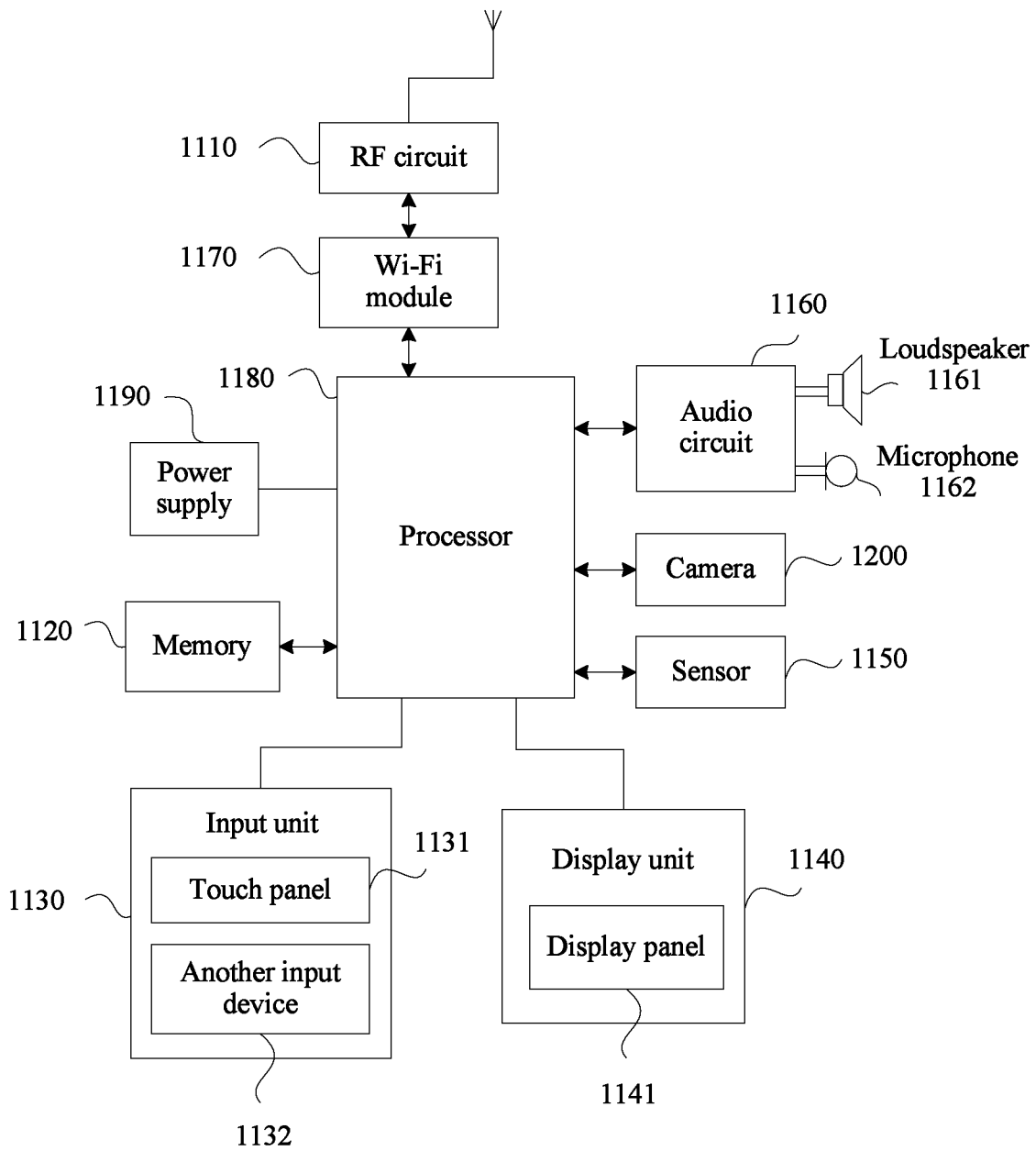
FIG. 12 is a block diagram of a part of a structure of a terminal device when the terminal device is a mobile phone according to an embodiment of the present invention.

Similar to the foregoing embodiment, the terminal device in this embodiment of the present invention may be a wireless terminal such as a mobile phone or a tablet computer. Therefore, for example, the terminal device is a mobile phone, and FIG. 12 is a block diagram of a part of a structure of the terminal device according to an embodiment of the present invention. Referring to FIG. 12, the mobile phone may include components such as a radio frequency (Radio Frequency, RF) circuit 1110, a memory 1120, an input unit 1130, a display unit 1140, a sensor 1150, an audio circuit 1160, a Wireless Fidelity (Wireless Fidelity, Wi-Fi) module 1170, a processor 1180, and a power supply 1190. A person skilled in the art may understand that the structure of the mobile phone shown in FIG. 12 does not constitute any limitation on the mobile phone. The mobile phone may include components more or fewer than those shown in FIG. 12, or combine some components, or have a different component arrangement.

The following describes the components of the mobile phone in detail with reference to FIG. 12.

The RF circuit 1110 may be configured to: receive and send a signal in an information receiving or sending process or a call process, and in particular, after receiving downlink information of a base station, send the downlink information to the processor 1180 for processing; and in addition, send uplink data to the base station. Generally, the RF circuit includes but is not limited to an antenna, at least one amplifier, a transceiver, a coupler, a low noise amplifier (Low Noise Amplifier, LNA), and a duplexer. In addition, the RF circuit 1110 may communicate with a network and other devices through radio communications. The foregoing radio communications may be based on any communications standard or protocol, which includes but is not limited to Global system for mobile communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, and a short message service (Short Messaging Service, SMS).

The memory 1120 may be configured to store a software program and a module. The processor 1180 runs the software program and the module that are stored in the memory 1120, so as to perform various function applications of the mobile phone and data processing. The memory 1120 may mainly include a program storage area and a data storage area, where the program storage area may store an operating system, an application program required by at least one function (such as a voice playing function and an image playing function), and the like; and the data storage area may store data (such as audio data and a phone book) created based on use of the mobile phone, and the like. In addition, the memory 1120 may include a high-speed random access memory, and may further include a nonvolatile memory such as at least one magnetic disk storage device, a flash memory device, or another volatile solid-state storage device.

The input unit 1130 may be configured to receive entered digital or character information, and generate key signal input related to user setting and function control of the mobile phone. Specifically, the input unit 1130 may include a touch panel 1131 and another input device 1132. The touch panel 1131, also referred to as a touchscreen, can collect a touch operation of the user on or near the touch panel 1131 (for example, an operation of the user on the touch panel 1131 or near the touch panel 1131 by using any proper object or accessory, such as a finger or a stylus), and can drive a corresponding connection apparatus according to a preset program. Optionally, the touch panel 1131 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, and sends the touch point coordinates to the processor 1180, and can receive and perform a command sent by the processor 1180. In addition, the touch panel 1131 may be implemented by using a plurality of types, such as a resistive type, a capacitive type, an infrared ray, and a surface acoustic wave. In addition to the touch panel 1131, the input unit 1130 may further include the another input device 1132. Specifically, the another input device 1132 may include but is not limited to one or more of a physical keyboard, a function key (for example, a volume control key or an on/off key), a trackball, a mouse, and an operating lever.

The display unit 1140 may be configured to display information entered by the user or information provided for the user, and various menus of the mobile phone. The display unit 1140 may include a display panel 1141. Optionally, the display panel 1141 may be disposed in a form such as a liquid crystal display (Liquid Crystal Display, LCD) or an organic light-emitting diode (Organic Light-Emitting Diode, OLED). Further, the touch panel 1131 may cover the display panel 1141. When detecting a touch operation on or near the touch panel 1131, the touch panel 1131 transfers the touch operation to the processor 1180 to determine a type of a touch event, and then the processor 1180 provides corresponding visual output on the display panel 1141 based on the type of the touch event. In FIG. 12, the touch panel 1131 and the display panel 1141 are used as two independent components to implement input and input functions of the mobile phone. However, in some embodiments, the touch panel 1131 and the display panel 1141 may be integrated to implement the input and output functions of the mobile phone.

The mobile phone may further include at least one sensor 1150, such as a light sensor, a motion sensor, or another sensor. Specifically, the light sensor may include an ambient light sensor and a proximity sensor. The ambient light sensor may adjust luminance of the display panel 1141 based on brightness of ambient light, and when the mobile phone moves to an ear, the light sensor may turn off the display panel 1141 and/or backlight. As a type of motion sensor, the acceleration sensor can detect an acceleration value in each direction (generally three axes), and detect a value and a direction of gravity when the acceleration sensor is static, and is applicable to an application for recognizing a mobile phone posture (for example, a switch between landscape and portrait screens, relevant games, and magnetometer posture calibration), a function related to vibration recognition (such as a pedometer or a knock), and the like. Other sensors such as a gyroscope, a barometer, a hygrometer, a thermometer, and an infrared sensor may also be disposed on the mobile phone, which is not described herein.

The audio circuit 1160, a loudspeaker 1161, and a microphone 1162 may provide audio interfaces between the user and the mobile phone. The audio circuit 1160 may transmit, to the loudspeaker 1161, a received electrical signal after audio data conversion, and the loudspeaker 1161 converts the electrical signal to a sound signal for output; in addition, a collected sound signal is converted by the microphone 1162 to an electrical signal and then is received by the audio circuit 1160 and converted to audio data, and the audio data is output to the processor 1180 for processing and then is sent to, for example, another mobile phone by using the RF circuit 1110, or the audio data is output to the memory 1120 for further processing.

Wi-Fi is a short-distance wireless transmission technology. By using the Wi-Fi module 1170, the mobile phone may help the user send and receive an email, browse a web page, access streaming media, and the like. The Wi-Fi module 1170 provides wireless broadband Internet access for the user. Although the Wi-Fi module 1170 is shown in FIG. 12, it should be understood that the Wi-Fi module 1170 is not a mandatory component of the mobile phone, and may be omitted according to a requirement without changing the essence of the present invention.

The processor 1180 is a control center of the mobile phone, connects to all parts of the entire mobile phone by using various interfaces and lines, and performs various functions of the mobile phone and data processing by running or executing the software program and/or the module that are/is stored in the memory 1120 and by invoking data stored in the memory 1120, so as to perform overall monitoring on the mobile phone. Optionally, the processor 1180 may include one or more processing units. Preferably, an application processor and a modem processor may be integrated into the processor 1180, where the application processor mainly processes an operating system, a user interface, an application program, and the like; and the modem processor mainly processes radio communications. It may be understood that the foregoing modem processor may not be integrated into the processor 1180.

The mobile phone further includes the power supply 1190 (such as a battery) that supplies power to each part. Preferably, the power supply may be logically connected to the processor 1180 by using a power management system, so that functions such as management of charging, discharging, and power consumption are implemented by using the power supply management system.

The mobile phone may further include a camera 1200. The camera may be a front-facing camera or a rear-facing camera. Although not shown in the figure, the mobile phone may further include a Bluetooth module, a GPS module, and the like. Details are not described herein.

In this embodiment of the present invention, the processor 1180 included in the mobile phone may be configured to perform the method embodiment of the foregoing downlink data transmission method. An implementation principle and a technical effect of the processor 1180 are similar to those of the method embodiment, and details are not described herein again.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A downlink data transmission method, comprising:
receiving, by a network device, carrier aggregation (CA) capability indication information from a terminal device, wherein the CA capability indication information indicates to the network device that the terminal device supports a first-type intra-band non-contiguous (NC) CA combination on a first frequency band and a maximum downlink spectrum width supported by the terminal device;
determining, by the network device based on the CA capability indication information, a first CA combination from at least one first-type intra-band NC CA combination of the first frequency band, wherein the first CA combination comprises at least two component carriers (CCs), wherein the at least two CCs comprise a license-free frequency band (B46 band), wherein the B46 band comprises a component carrier 1 (CC1), a component carrier 2 (CC2), a component carrier 3 (CC3), and a component carrier 4 (CC4), wherein the at least two CCs comprise a combination of two of the CC1, the CC2, the CC3, and the CC4, and wherein a spectrum width of the first CA combination is less than or equal to the maximum downlink spectrum width supported by the terminal device; and
sending, by the network device, downlink data to the terminal device using the first CA combination.

2. The downlink data transmission method of claim 1, wherein determining the first CA combination comprises:
determining, by the network device, a maximum occupied spectrum width based on a spectrum width occupied by each first-type intra-band NC CA combination; and determining, by the network device, the first CA combination based on the maximum occupied spectrum width and the maximum downlink spectrum width supported by the terminal device.

3. The downlink data transmission method of claim 2, wherein determining the first CA combination based on the maximum occupied spectrum width and the maximum downlink spectrum width supported by the terminal device comprises:
  determining, by the network device based on the maximum occupied spectrum width and the maximum downlink spectrum width supported by the terminal device, that the maximum downlink spectrum width supported by the terminal device is less than the maximum occupied spectrum width;
  determining, by the network device from the at least one first-type intra-band NC CA combination of the first frequency band, at least one second available CA combination whose spectrum width is less than or equal to the maximum downlink spectrum width; and
  determining, by the network device, the first CA combination based on the at least one second available CA combination, wherein the at least one second available CA combination comprises the first CA combination.

4. The downlink data transmission method of claim 2, wherein determining the first CA combination based on the maximum occupied spectrum width and the maximum downlink spectrum width supported by the terminal device comprises:
  determining, by the network device based on the maximum occupied spectrum width and the maximum downlink spectrum width supported by the terminal device, that the maximum downlink spectrum width supported by the terminal device is greater than or equal to the maximum occupied spectrum width; and
  determining, by the network device, the first CA combination from the at least one first-type intra-band NC CA combination.

5. The downlink data transmission method of claim 1, wherein receiving the CA capability indication information from the terminal device comprises receiving, by the network device, terminal device capability information from the terminal device, and wherein the terminal device capability information comprises the CA capability indication information.

6. The downlink data transmission method of claim 1, wherein the first frequency band is a licensed-assisted access (LAA) frequency band.

7. A downlink data transmission apparatus, comprising:
  a receiver configured to receive carrier aggregation (CA) capability indication information from a terminal device, wherein the CA capability indication information indicates to a network device that the terminal device supports a first-type intra-band non-contiguous (NC) CA combination on a first frequency band and a maximum downlink spectrum width supported by the terminal device;
  a processor coupled to the receiver and configured to determine, based on the CA capability indication information received by the receiver, a first CA combination from at least one first-type intra-band NC CA combination of the first frequency band, the first CA combination comprising at least two component carriers (CCs), wherein the at least two CCs comprise a license-free frequency band (B46 band), wherein the B46 band comprises a component carrier 1 (CC1), a component carrier 2 (CC2), a component carrier 3 (CC3), and a component carrier 4 (CC4), wherein the at least two CCs comprise a combination of two of the CC1, the CC2, the CC3, and the CC4, and wherein a spectrum width of the first CA combination is less than or equal to the maximum downlink spectrum width supported by the terminal device; and
  a transmitter coupled to the processor and configured to send downlink data to the terminal device using the first CA combination determined by the processor.

8. The downlink data transmission apparatus of claim 7, wherein the processor is further configured to:
  determine a maximum occupied spectrum width based on a spectrum width occupied by each first-type intra-band NC CA combination; and
  determine the first CA combination based on the maximum occupied spectrum width and the maximum downlink spectrum width supported by the terminal device.

9. The downlink data transmission apparatus of claim 8, wherein in determining the first CA combination based on the maximum occupied spectrum width and the maximum downlink spectrum width supported by the terminal device, the processor is further configured to:
  determine, based on the maximum occupied spectrum width and the maximum downlink spectrum width supported by the terminal device, that the maximum downlink spectrum width supported by the terminal device is less than the maximum occupied spectrum width;
  determine, from the at least one first-type intra-band NC CA combination of the first frequency band, at least one second available CA combination whose spectrum width is less than or equal to the maximum downlink spectrum width; and
  determine the first CA combination based on the at least one second available CA combination, wherein the at least one second available CA combination comprises the first CA combination.

10. The downlink data transmission apparatus of claim 8, wherein in determining the first CA combination based on the maximum occupied spectrum width and the maximum downlink spectrum width supported by the terminal device, the processor is further configured to:
  determine, based on the maximum occupied spectrum width and the maximum downlink spectrum width supported by the terminal device, that the maximum downlink spectrum width supported by the terminal device is greater than or equal to the maximum occupied spectrum width; and
  determine the first CA combination from the at least one first-type intra-band NC CA combination.

11. The downlink data transmission apparatus of claim 7, wherein the receiver is further configured to receive terminal device capability information from the terminal device, and wherein the terminal device capability information comprises the CA capability indication information.

12. The downlink data transmission apparatus of claim 7, wherein the first frequency band is a licensed-assisted access (LAA) frequency band.

13. A downlink data transmission apparatus, comprising:
  a processor; and
  a transmitter coupled to the processor and configured to:
    send carrier aggregation (CA) capability indication information to a network device, wherein the CA capability indication information indicates to the network device that a terminal device supports a first-type intra-band non-contiguous (NC) CA combination on a first frequency band and a maximum downlink spectrum width supported by the terminal device; and receive downlink data from the network device using at least two component carriers (CCs), wherein the at least two CCs comprise a license-free frequency band (B46 band), wherein the B46 band comprises a component carrier 1 (CC1), a component carrier 2 (CC2), a component carrier 3 (CC3), and a component carrier 4 (CC4), wherein the at least two CCs comprise a combination of two of the CC1, the CC2, the CC3, and the CC4, and wherein a spectrum width of the first CA combination is less than or equal to the maximum downlink spectrum width supported by the terminal device.

14. The downlink data transmission apparatus of claim 13, wherein the processor is configured to obtain the maximum downlink spectrum width supported by the terminal device before the transmitter sends the CA capability indication information to the network device.

15. The downlink data transmission apparatus of claim 14, wherein the processor is further configured to determine the maximum downlink spectrum width supported by the terminal device based on performance of a low noise amplifier (LNA) of the terminal device.

16. The downlink data transmission apparatus of claim 15, wherein the transmitter is further configured to send terminal device capability information to the network device, and wherein the terminal device capability information comprises the CA capability indication information.

17. The downlink data transmission apparatus of claim 14, wherein the transmitter is further configured to send terminal device capability information to the network device, and wherein the terminal device capability information comprises the CA capability indication information.

18. The downlink data transmission apparatus of claim 14, wherein the first frequency band is a licensed-assisted access (LAA) frequency band.

19. The downlink data transmission apparatus of claim 13, wherein the transmitter is further configured to send terminal device capability information to the network device, and wherein the terminal device capability information comprises the CA capability indication information.

20. The downlink data transmission apparatus of claim 13, wherein the first frequency band is a licensed-assisted access (LAA) frequency band.

* * * * *